ated States, resid-
UNITED STATES PATENT OFFICE.

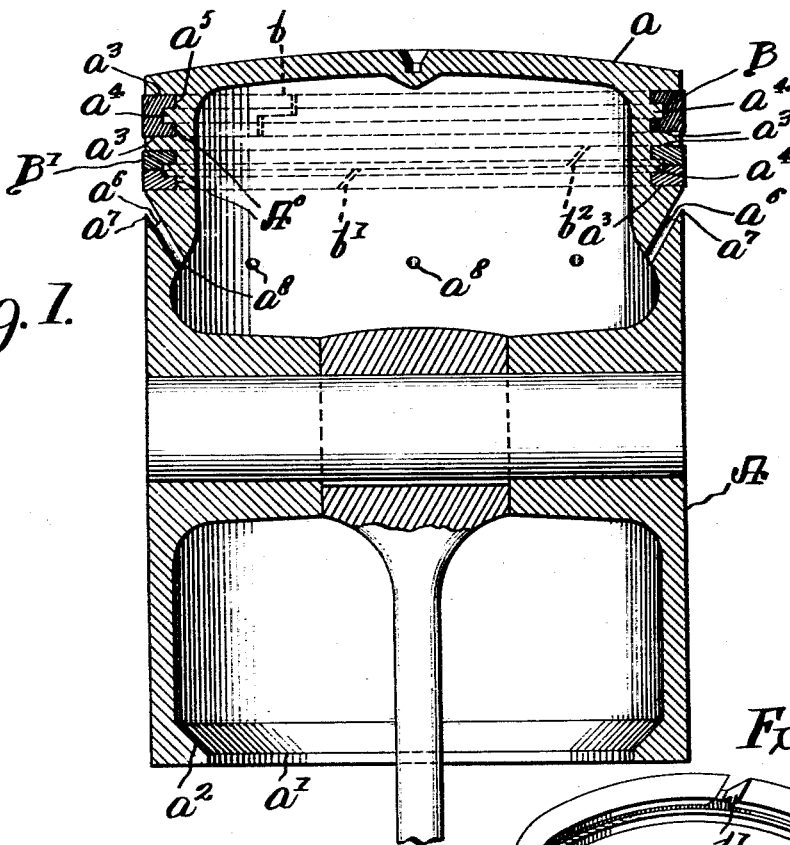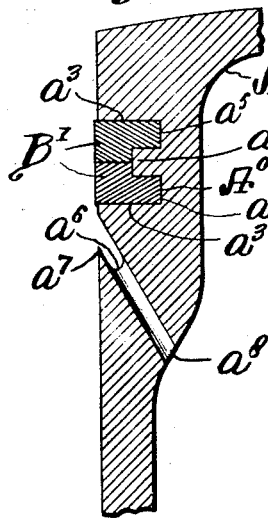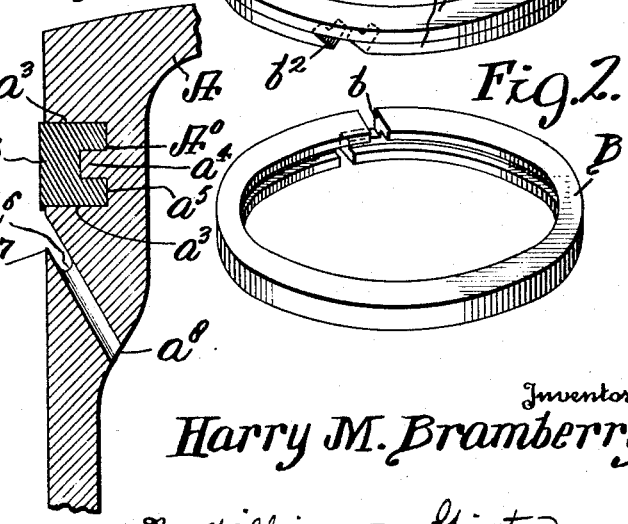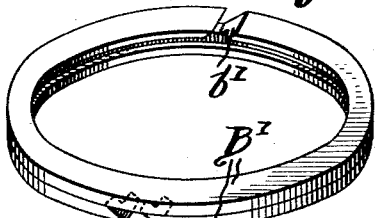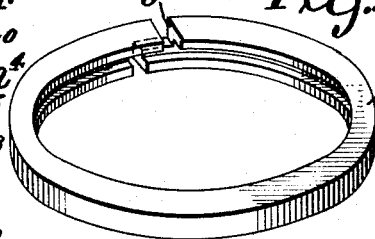

HARRY MORTON BRAMBERRY, OF NORFOLK, VIRGINIA.

METALLIC PISTON-PACKING. REISSUED 1,382,465.    Specification of Letters Patent.    Patented June 21, 1921.

Application filed February 12, 1920. Serial No. 358,259.

*To all whom it may concern:*

Be it known that I, HARRY MORTON BRAM-BERRY, a citizen of the United States, residing at Norfolk, in the county of Norfolk and State of Virginia, have invented certain new and useful Improvements in Metallic Piston-Packings; and I do hereby declare the following to be a full, clear, and exact description of the invention, such as will enable others skilled in the art to which it appertains to make and use the same.

My invention relates to improvements in metallic piston packing for cylinders, and relates more especially to an improved combination of packing rings and grooves provided therefor for use on internal combustion engines.

In such engines as at present constructed, there is a tendency for the lubricating oil to be fed too rapidly along the sides of the cylinder into the combustion chamber, due to the oil passing the packing rings and reaching the combustion end of the cylinder where it is consumed, producing more or less gummy carbon which increases the friction and interferes with the proper operation of the spark plugs, valves, etc.

According to my invention I provide an arrangement for trapping part of the oil before it passes the packing rings. When operating an internal combustion engine at low speed, if the rings are sufficiently tight there is considerable vacuum created in the combustion chamber as the piston is withdrawn on the suction stroke. This tends to suck the oil exterior to or through the breaks in the packing rings and around and inside the sides and back of said rings until part of the oil reaches the combustion chamber where it is consumed on the ignition stroke, with the objectionable results as hereinbefore described.

Due to this action there is, with the engines as now generally constructed, an abnormal or excessive flow of oil past the packing rings when the engine is being driven at low speeds. The passage of an excess of oil is also unavoidable with the construction referred to at high speeds, but in such cases the waste of oil is proportionately less.

My invention is intended in a large degree to remedy this flow of excessive oil past the packing rings as will be hereinafter described.

My invention will be more fully understood after reference to the accompanying drawings, in which like parts are indicated by similar reference symbols throughout the several views, and in which:

Figure 1 shows a central vertical section through the piston of an ordinary internal combustion engine fitted with my improved packing arrangement, the piston pin and connecting rod being shown in elevation.

Fig. 2 shows a single ring adapted to be used with a groove of the character shown in Fig. 1.

Fig. 3 shows a double ring adapted to be used with a groove of the character shown in Fig. 1.

Fig. 4 shows a modification in which a single ring is used in a single groove; and Fig. 5 shows a modification in which a double ring is shown in a single groove.

A represents a hollow piston of the usual type as commonly used on internal combustion engines, which is provided with a closed end $a$ and an open end $a'$. Around the open end of the piston there is a tapered lip $a^2$ which serves to direct any oil which falls in the hollow chamber in the piston toward the center of the cylinder and away from the walls thereof, and also serves as a stiffening rib to strengthen the open end of the piston.

The piston is provided with any suitable number of grooves to receive the packing rings, and in Fig. 1, I have shown two such grooves, in Figs. 4 and 5 I have shown only one of said grooves, but the number may be increased to more than two if desired to suit varying conditions.

The various grooves indicated by $A^0$ have parallel side walls $a^3$ midway between which grooves projects the annular rib $a^4$ which is rectangular in cross section. The sides of this annular rib are parallel with the side walls $a^3$ of the groove $A^0$. Between this rib and the adjacent side walls there is an annular pocket $a^5$.

The packing ring may be either of the single or double type; if of the single type, as shown at B in Figs. 1, 2 and 4, it has an annular groove cut on its interior which fits snugly over the annular rib $a^4$, and this ring is split in any convenient way, as by the lap-joint cut $b$ shown in Figs. 1 and 2. With the double ring B' shown in Figs. 1, 3 and 5, each part of the double ring is formed in the shape of an L, with two edges abutting to form an annular groove to engage the annular rib $a^4$. In case the rings are made in two sections the joint would, of course, be broken, as indicated at $b'$ and $b^2$ in Figs. 1 and 3.

On the interior of the piston adjacent to the lower ring and between the lower ring and the open end of the piston I provide an oil groove of the special design shown in Figs. 1, 4 and 5, in which there is a cup-shaped annular groove $a^6$, the edge $a^7$ of which serves to plane off the oil from the interior of the cylinder and to direct it into the groove $a^6$. This planing action of the lip $a^7$ is also assisted by the scraping action of the lower edge of the packing ring, which tends to scrape the oil off the interior of the cylinder and direct it to the annular groove $a^6$ already referred to.

In order to carry off the oil, which tends to accumulate in this groove $a^6$, I provide a series of ducts $a^8$ of suitable size, which are inclined inward as shown, and these ducts permit the oil to drain through into the interior of the hollow cylinder and also direct it in toward the axis of said piston. If any oil trickles down the inner wall of said piston it will ultimately reach the inclined rib $a^2$ and will be deflected in toward the axis of the piston, away from the walls of the cylinder.

Any oil that is sucked by the vacuum toward the combustion end of the cylinder is obliged either to flow outside of the packing rings, or between the packing rings and inner walls of the cylinder, and such part of the oil as passes outside the packing rings is ordinarily very efficient in lubricating the packing rings, while any excess oil thus sucked through or inside the rings will have to flow through the constricted passages between the adjacent faces of the grooves, and the annular rib and the adjacent faces of the ring or rings, so that this oil, in order to pass inside of the packing rings, will be obliged to follow a very tortuous channel.

I have found in practice that any leakage past the interior of the rings is greatly decreased by having as low clearance as practicable between the ring and the adjacent walls of the groove. By making these clearances as small as practicable I have found that there is very little leakage of oil with the construction designed by me and shown in the drawings.

It will be obvious also that, by having the tight joint referred to, a better compression is secured on the compression stroke, and less waste of oil, and better results on the expansion stroke, there being very little leakage of air or gas in either case by the packing ring.

In low speed motors, especially of larger size, a single ring, as shown in Fig. 4, has been found highly efficient; whereas where the motors are small, especially if the piston speed is high, the double ring shown in Fig. 5 is preferred, and in such cases the piston is generally more loosely fitted in the cylinder than with the slow speed engines, and the ring in two parts has been found preferable.

In order to get the best results, it is desirable that the cutting of the groove for the packing ring and also the groove for the oil be done very accurately, and for this purpose it is generally preferable to use a special form of cutting implement to secure the accuracy desired.

It will be obvious that various modifications might be made in the herein described apparatus, and in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. In a metallic piston packing, the combination with a piston provided with an annular groove in the cylindrical portion thereof, said groove having parallel side walls perpendicular to the axis of the piston, and the said piston being provided with an annular rib rectangular in cross section projecting outward from the center of the bottom of said groove, said rib separating said groove into two channels of equal depth, of a split packing ring sprung into said groove, said ring having a cylinder bearing surface and an internal groove also rectangular in cross section, with the bottom of said internal groove engaging the periphery of said rib, the side walls of said ring groove projecting into and registering with said piston channels, said side walls being of less cross sectional area than the cylinder bearing wall of said ring.

2. In a metallic piston packing, the combination with a piston provided with an annular groove in the cylindrical portion thereof, said groove having parallel side walls perpendicular to the axis of the piston, and an annular rib rectangular in cross section projecting outward from the center of the bottom of said groove, of a split packing ring made in two halves each L-shaped in cross section sprung into said groove, and having faces registering with the walls of said groove.

HARRY MORTON BRAMBERRY.